(12) United States Patent
Mochizuki (10) Patent No.: US 9,055,182 B2
(45) Date of Patent: Jun. 9, 2015

(54) IMAGE CODING APPARATUS, IMAGE CODING METHOD, AND PROGRAM

(71) Applicant: CANON KABUSHIKI KAISHA, Tokyo (JP)

(72) Inventor: Shigeki Mochizuki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 58 days.

(21) Appl. No.: 14/033,581

(22) Filed: Sep. 23, 2013

(65) Prior Publication Data

US 2014/0098268 A1 Apr. 10, 2014

(30) Foreign Application Priority Data

Oct. 4, 2012 (JP) ................................. 2012-222170

(51) Int. Cl.

| *G06K 9/36* | (2006.01) |
|---|---|
| *H04N 9/04* | (2006.01) |
| *H04N 19/61* | (2014.01) |
| *H04N 1/64* | (2006.01) |
| *H04N 19/503* | (2014.01) |

(52) U.S. Cl.
CPC .............. *H04N 9/045* (2013.01); *H04N 19/503* (2014.11); *H04N 19/61* (2014.11); *H04N 1/648* (2013.01)

(58) Field of Classification Search
CPC . H04N 19/90; H04N 19/50; H04N 19/00575; H04N 19/61; H04N 19/109; H04N 19/11; H04N 9/045
See application file for complete search history.

(56) References Cited

U.S. PATENT DOCUMENTS

| 2003/0052981 | A1* | 3/2003 | Kakarala et al. ............... 348/272 |
| 2004/0126019 | A1* | 7/2004 | Ikebe et al. .................... 382/232 |
| 2008/0089595 | A1* | 4/2008 | Park .............................. 382/233 |
| 2010/0189183 | A1* | 7/2010 | Gu et al. .................. 375/240.28 |

FOREIGN PATENT DOCUMENTS

JP 2011-166219 A 8/2011

* cited by examiner

*Primary Examiner* — Ali Bayat
(74) *Attorney, Agent, or Firm* — Carter, DeLuca, Farrell & Schmidt, LLP (57) ABSTRACT

An image coding apparatus for coding RAW data of an image of a Bayer array separates the RAW data respectively into separate planes of data of a plurality of color components constituting the Bayer array, determines a coding method for coding each plane from a plurality of coding methods, generates a coding parameter on the basis of the determined coding method, and codes each plane on the basis of the generated coding parameter, wherein when a coding-target plane is a plane to be coded later among the plurality of planes of the same color, a coding parameter for coding the plane to be coded later is generated by using a result of the coding of the plane to be coded earlier among the plurality of planes of the same color.

15 Claims, 11 Drawing Sheets

BAYER ARRAY (G0/R/B/G1)

| G0 | R | G0 | R | G0 | R |
|----|---|----|---|----|---|
| B | G1 | B | G1 | B | G1 |
| G0 | R | G0 | R | G0 | R |
| B | G1 | B | G1 | B | G1 |

↓ SEPARATE

G0 PLANE

| G0 | G0 | G0 |
|----|----|----|
| G0 | G0 | G0 |

G1 PLANE

| G1 | G1 | G1 |
|----|----|----|
| G1 | G1 | G1 |

B PLANE

| B | B | B |
|---|---|---|
| B | B | B |

R PLANE

| R | R | R |
|---|---|---|
| R | R | R |

| G0 | R | G0 | R |
|----|---|----|---|
| B | G1 | B | G1 |
| G0 | R | G0 | R |
| B | G1 | B | G1 |

FIG. 11

IMAGE CODING APPARATUS, IMAGE CODING METHOD, AND PROGRAM

BACKGROUND OF THE INVENTION

1. Field of the Invention

The present invention relates to an image coding apparatus and an image coding method for coding an image signal of a Bayer array.

2. Description of the Related Art

Figure 7:
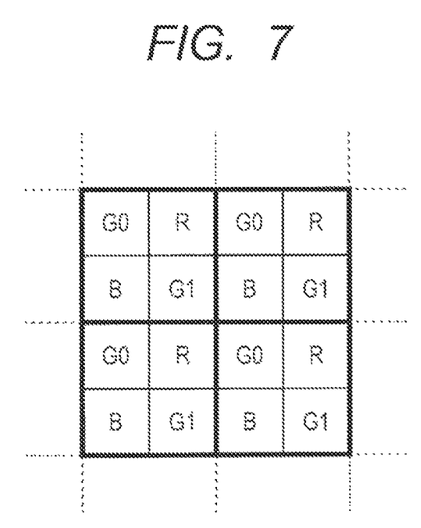
FIG. 7 is a diagram illustrating an example of the Bayer array.

A CCD or CMOS image sensor is used in an image pickup element of a recent digital camera. In this case, in an image pickup element of a single plate type, for example, by receiving object light through a color filter of a Bayer array as illustrated in FIG. 7, pixel data of green, blue, and red (hereinbelow, called RAW data) is obtained. In the example of FIG. 7, the color filter is constructed by a periodic layout pattern of G0 (green), R (red), B (blue), and G1 (green). Since a human visual sensitivity is more sensitive to a brightness component than that to a color component, an area which is twice as large as that for red or blue is allocated to green containing a large quantity of brightness component. Since the RAW data of the Bayer array has only information of one color component to one pixel, it is necessary to generate three color components of green, blue, and red to one pixel. Such a process for generating such three color components as mentioned above is called a de-mosaicking process. Generally, when image data is recorded, image data of an RGB signal obtained by the de-mosaicking process or image data obtained by transforming the RGB signal into a YUV signal is coded and recorded. However, since the image data obtained by the de-mosaicking process has a data amount which is thrice as large as that of the RAW data, there is such a problem that it takes a time for a coding processing, or the like. Therefore, a method whereby the RAW data before the de-mosaicking process is coded and recorded has also been proposed. For example, a method whereby the RAW data of the Bayer array is arranged in a tetragonal lattice manner for every color component and is coded by using MPEG-2 (ISO/IEC 13818-2) or MPEG-4 AVC (ISO/IEC 14496-10) is shown (for example, refer to the Official Gazette of Japanese Patent Application Laid-Open No. 2011-166219).

However, in the RAW data of the Bayer array, since pixel data of the green component has an information amount which is twice as large as that of the blue component or red component and an amount of coding processing to the green component is twice as large as that of the blue or red component, a method of more efficiently coding the image data of the green component is demanded.

SUMMARY OF THE INVENTION

It is, therefore, an aspect of the invention to provide an image coding apparatus which can more efficiently execute a coding process of RAW data of a Bayer array at a higher speed.

To accomplish the above aspect, according to the invention, an image coding apparatus for coding RAW data of an image of a Bayer array, separates the RAW data is respectively separated into separate planes of data of a plurality of color components constituting the Bayer array, determines a coding method for coding each plane from among a plurality of coding methods, generates a coding parameter on the basis of the determined coding method, and codes each plane on the basis of the generated coding parameter, wherein in the case where a coding-target plane is a plane to be coded later among a plurality of planes of a same color, the apparatus determines a coding method including an inter-plane prediction from the plurality of coding methods, and generates a coding parameter for coding the plane to be coded later on the basis of a result of the coding of a plane to be coded earlier among the plurality of planes of the same color.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the present invention will be described in detail below with reference to the drawings.

First Embodiment

Figure 1:
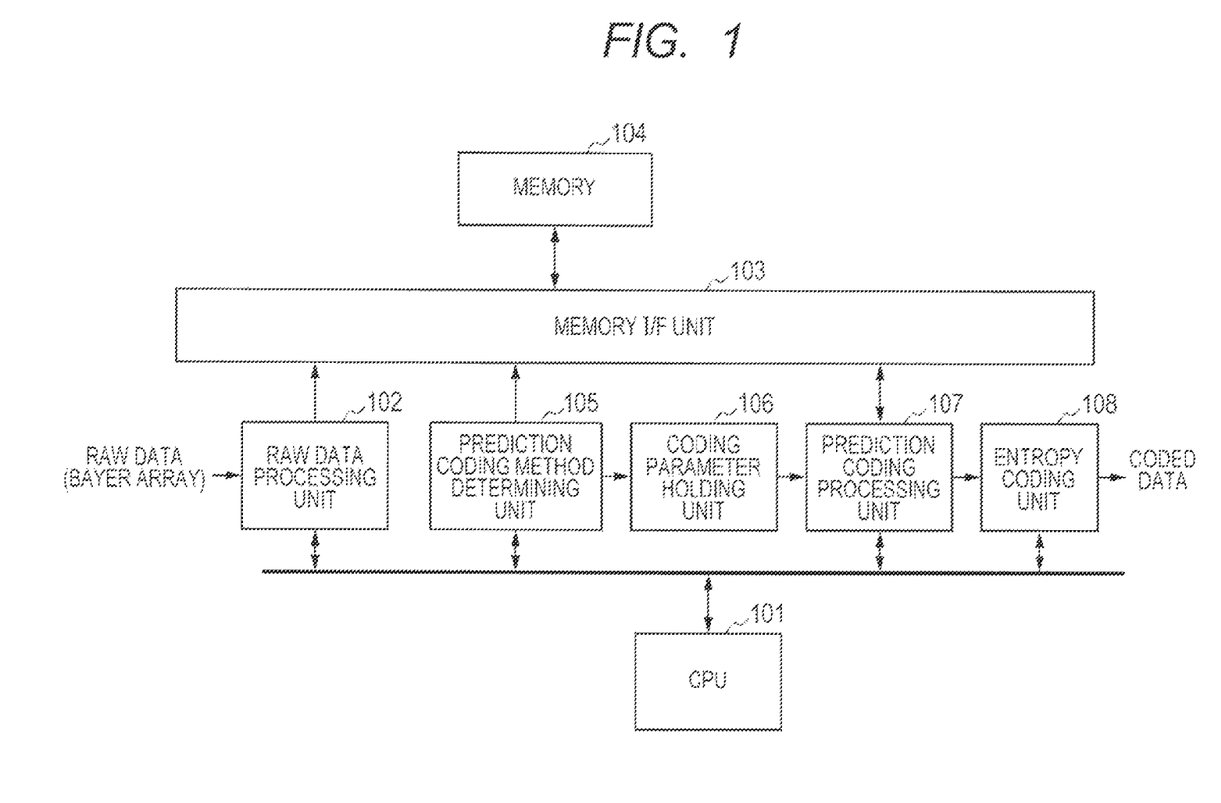
FIG. 1 is a block diagram illustrating a construction of an image coding apparatus according to the first embodiment of the invention.

FIG. 1 illustrates a block diagram of an image coding apparatus according to the first embodiment of the invention. The image coding apparatus according to the embodiment is an image coding apparatus arranged to code pixel data of green, blue, and red (RAW data) of the Bayer array as illustrated in the example of FIG. 7 by an MPEG-4 AVC method or a compression coding method similar thereto. The MPEG-4 AVC method is also called ISO/IEC 14496-10 or H.264. A construction of the image coding apparatus according to the embodiment will be described with reference to the block diagram of FIG. 1.

Figure 2:
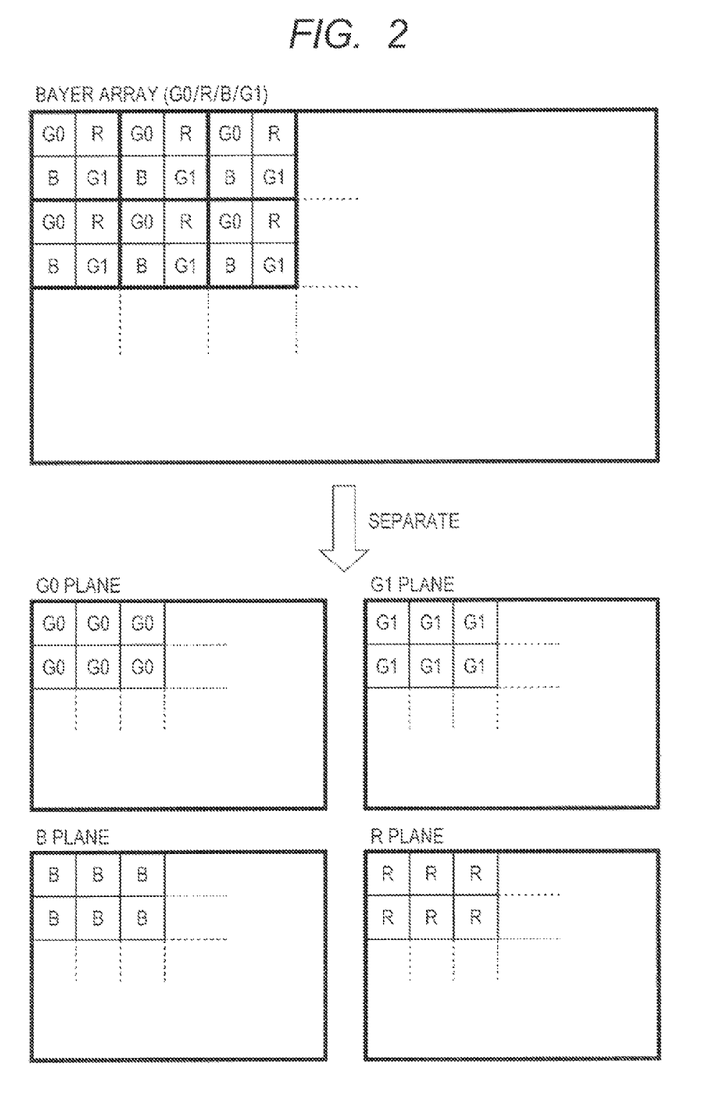
FIG. 2 is a diagram schematically illustrating a picture separating method of RAW data of a Bayer array.

A CPU 101 controls each processing unit constructing the image coding apparatus. As illustrated in FIG. 2, an RAW data processing unit 102 separates the RAW data which is input into separate planes every pixel of G0, B, R, and G1 and writes into a memory 104 through a memory interface (I/F) unit 103. The memory I/F unit 103 arbitrates memory/access requests from the respective processing units and performs reading-out/writing control to the memory 104. The memory 104 is a storage area for holding various kinds of data which is output from each processing unit.

A prediction coding method determining unit 105 determines a prediction coding method of a picture corresponding to each plane of G0, B, R, and G1 separated by the RAW data processing unit 102. Specifically speaking, by executing a simple intra-picture prediction (specifically, intra-plane prediction) or an inter-picture prediction (specifically, inter-plane prediction) including a motion detection on a coding-target image and a coded image, an evaluation value showing a coding efficiency is calculated. The prediction coding method of the higher coding efficiency is determined and a coding parameter is generated. In the case where a coding-target pixel block is an I slice, an intra-picture prediction pixel block size and a prediction mode are determined. In the case of a P slice or B slice, the prediction of the higher coding efficiency between the intra-picture prediction and the inter-picture prediction is selected. When the intra-picture prediction is selected, parameters for intra-picture prediction coding such as intra-picture prediction pixel block size, intra-picture prediction mode, and the like are determined. When the inter-picture prediction is selected, parameters for intra-picture prediction coding such as reference image frame, pixel block division information, motion vector, and the like are determined. The coding parameters determined as mentioned above are output to a prediction coding processing unit 107. A coding parameter holding unit 106 is a storage area for holding the coding parameters determined by the prediction coding method determining unit 105. The coding parameters are constructed by intra-picture prediction mode information to the intra-picture prediction, reference image frame and motion vector information, quantization parameter, and the like to the inter-picture prediction.

In the prediction coding processing unit 107, on the basis of the coding parameters stored in the coding parameter holding unit 106, a prediction image is generated from the coded image which is read out of the memory 104. Subsequently, a prediction residual signal serving as a difference between the coding-target image (pixel block) and the prediction image is generated and an orthogonal transform process by an integer-precision discrete cosine transformation and a discrete Hadamard transformation is performed on a designated pixel block unit (block unit of 8×8 pixels or 4×4 pixels) basis. The discrete Hadamard transformation is performed to a DC (direct current) component which is a result obtained by integer-precision discrete cosine transforming each pixel block of a brightness signal or a color difference signal to which the intra-picture prediction is performed on a unit basis of 16×16 pixel block. A transformation coefficient which is orthogonal transformed is quantized by a quantizing step according to the designated quantization parameter and is output as quantization data to an entropy coding unit 108. At the same time, an inverse quantization process and an inverse orthogonal transform process (inverse discrete Hadamard transformation and inverse integer-precision discrete cosine transformation) are executed to the quantization data, a prediction image is added to the obtained data, and a decoding process is executed thereto. The data which is decoded as mentioned above is held in the memory 104. The decoded data held in the memory 104 is used for the subsequent intra-picture prediction. Further, the decoded data to which a deblocking file process has been performed is held in the memory 104. The decoded data after the deblocking file process held in the memory 104 is used for the subsequent inter-picture prediction.

In the entropy coding unit 108, an entropy coding process by a variable length coding, binary arithmetic coding of a context adaptive type, or the like is executed to the quantization data which is input, and coded data is output. The variable length coding of the context adaptive type is, for example, CAVLC (Context-based Adaptive Variable Length Coding). The binary arithmetic coding of the context adaptive type is, for example, CABAC (Context-based Adaptive Binary Arithmetic Coding).

The image coding apparatus of the embodiment is constructed as mentioned above.

Figure 3:
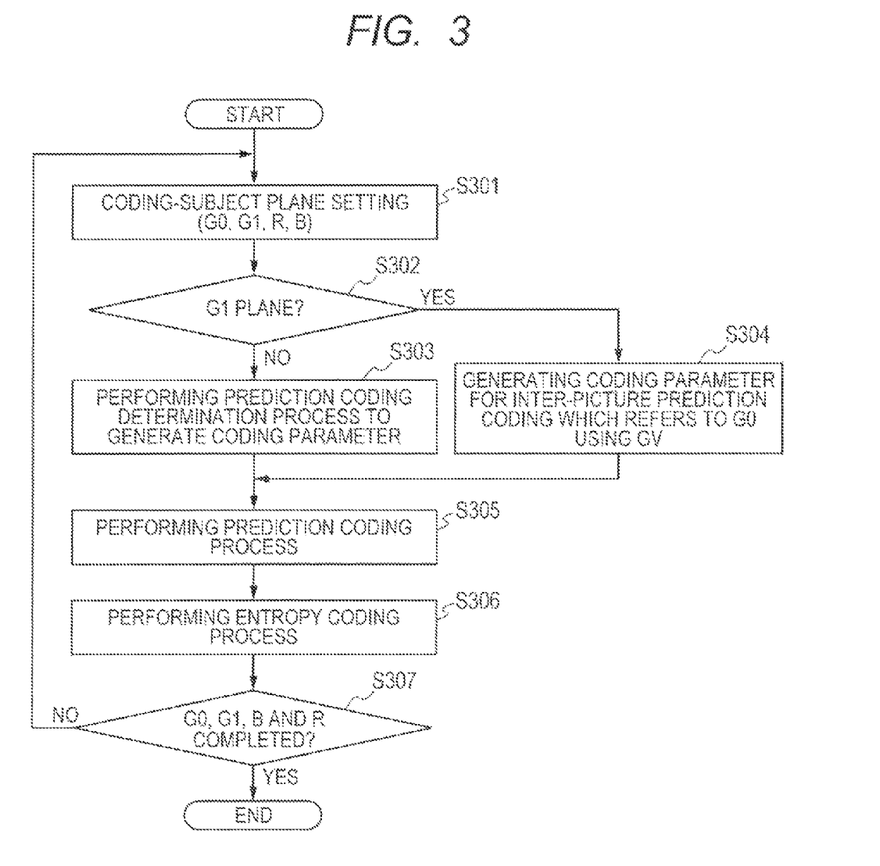
FIG. 3 is a diagram illustrating a flowchart for the coding operation of the image coding apparatus according to the first embodiment of the invention.

Subsequently, a coding process of one frame of the RAW data will be described with reference to a flowchart illustrated in FIG. 3. The coding operation based on the flowchart is realized by, for example, a method whereby the CPU 101 loads and executes a program stored in a memory (not shown) of the foregoing image coding apparatus, thereby controlling each processing unit of the image coding apparatus.

First, to which one of the G0 (first green component) plane, G1 (second green component) plane, B (blue component) plane, and R (red component) plane separated by the RAW data processing unit 102 the coding process is executed is set (S301). It is now assumed that such planes are set in order of G0, G1, B, and R.

When the coding-target picture is set, whether the coding-target picture is a G1 plane or another plane is discriminated (S302). When the coding-target picture is a plane other than G1, the foregoing prediction coding method determination process is executed by the prediction coding method determining unit 105 and a coding parameter is generated and stored into the coding parameter holding unit 106 (S303).

Figure 4:
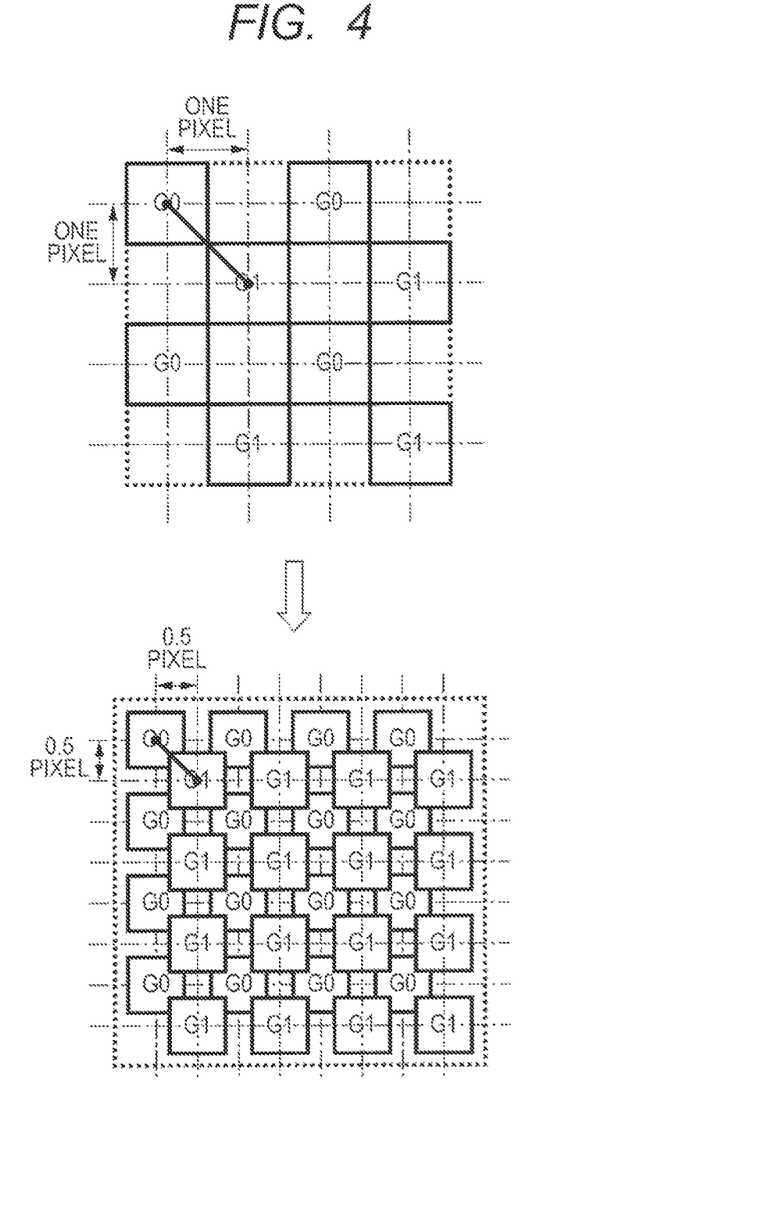
FIG. 4 is a diagram illustrating a positional relationship between G0 and G1 pixels in the Bayer array.

When the coding-target picture is the G1 plane, a coding parameter for the inter-picture prediction is generated in consideration of a correlation suggested from a positional relationship between the plurality of planes G1 and G0 of the same color obtained in the same frame by the Bayer array illustrated in FIG. 4. Specifically speaking, since the pixel of the G1 plane corresponds to the position of 0.5 pixel in both of the horizontal and vertical directions to the G0 plane, the prediction coding method determining unit 105 generates the coding parameter for the inter-picture prediction using a vector value (GV) based on such a distance (S304). Thus, the prediction coding processing unit 107 uses the G0 plane which is already coded as a picture to be referred to and performs the inter-picture prediction coding of the coding-target picture (picture referring to the picture to be referred to) G1. In this manner, in the embodiment, to the G1 plane to be coded later than the G0 plane, the coding method determination process is not executed but a coding parameter for the inter-picture prediction coding using the coded G0 plane is generated.

Subsequently, the prediction coding processing unit 107 executes the prediction coding based on the coding parameter which is generated by the prediction coding method determining unit 105 and stored in the coding parameter holding unit 106 (S305) and executes the entropy coding to the generated quantization data (S306).

When the coding is executed to all of the G0, G1, B, and R planes, the coding process of one frame is completed (S307). Although the example of the process on a frame unit basis is shown here, the similar process may be executed on a macro block basis constructed by a unit of 16×16 pixels.

Figure 5A:
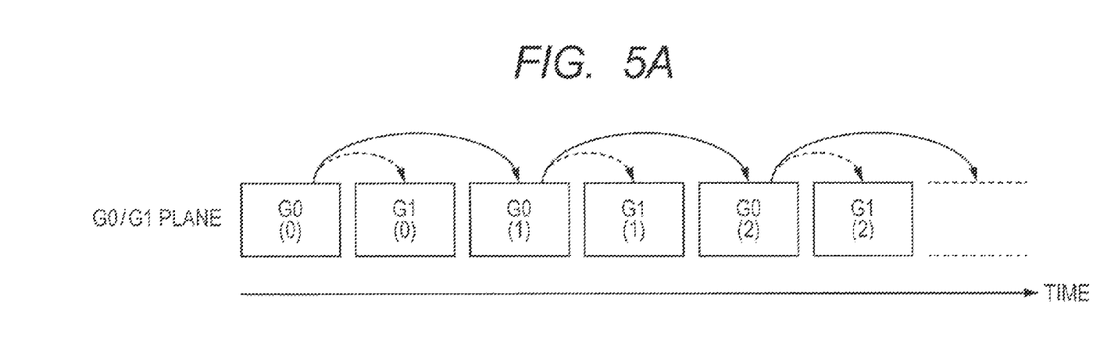
FIGS. 5A and 5B are diagrams illustrating a coding scheme of G0 and G1 planes according to the first embodiment of the invention.
Figure 5B:
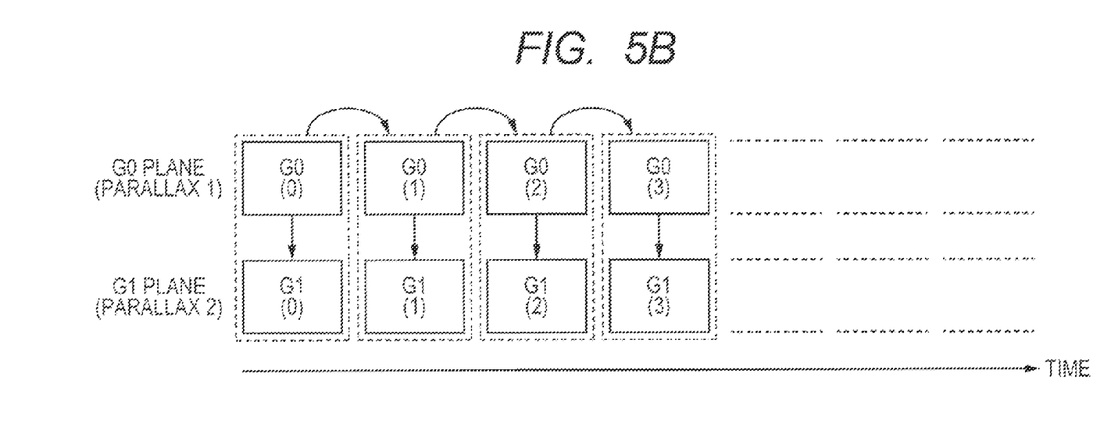

With respect to the G0 and G1 planes, as illustrated in FIG. 5A, they may be coded as a series of image data of a double frame rate in which the G0 and G1 planes are time-sequentially arranged. As illustrated in FIG. 5B, the G0 and G1 planes may be coded as a stereoscopic image in which they are set to different parallax image data. In any of those cases, there is no reference relationship between the G1 planes, and the G1 plane is coded on the basis of a reference relationship with the G0 plane.

As mentioned above, according to the embodiment, the planes of each color component of the Bayer array are handled like independent planes. With respect to the G1 plane among them, the coding method determination process which is executed to other planes is not executed but the inter-picture prediction coding (specifically, inter-plane prediction coding) using the correlation between G0 and G1 is performed. Specifically speaking, the inter-picture prediction coding which refers to the G0 plane with a common vector value based on a distance between the pixel positions of G0 and G1 in the Bayer array is performed to the planes, thereby reducing the coding parameter generation process of the green component. Thus, the high-speed and efficient coding processing of the RAW data can be executed.

Modification of the First Embodiment

In the first embodiment, the correlation between the G1 plane and the G0 plane is used as a prerequisite and the inter-picture prediction coding based on the fundamental vector based on the distance between the pixel positions of G0 and G1 is executed to the G1 plane. A modification of the first embodiment has such a construction that a degree of correlation between the prediction plane of the G0 plane and the G1 plane is discriminated and when the correlation is high, the inter-picture prediction coding based on the fundamental vector is performed.

Since a construction of the image coding apparatus in the modification is similar to that of the image coding apparatus of the first embodiment, its description is omitted here. The modification differs from the first embodiment with respect to the prediction coding method determination process of the prediction coding method determining unit 105. The coding operation according to the modification will be described with reference to a flowchart of FIG. 6. Substantially the same processing steps as those in the flowchart of FIG. 3 are designated by the same reference numerals and their description will be simply made.

Figure 6:
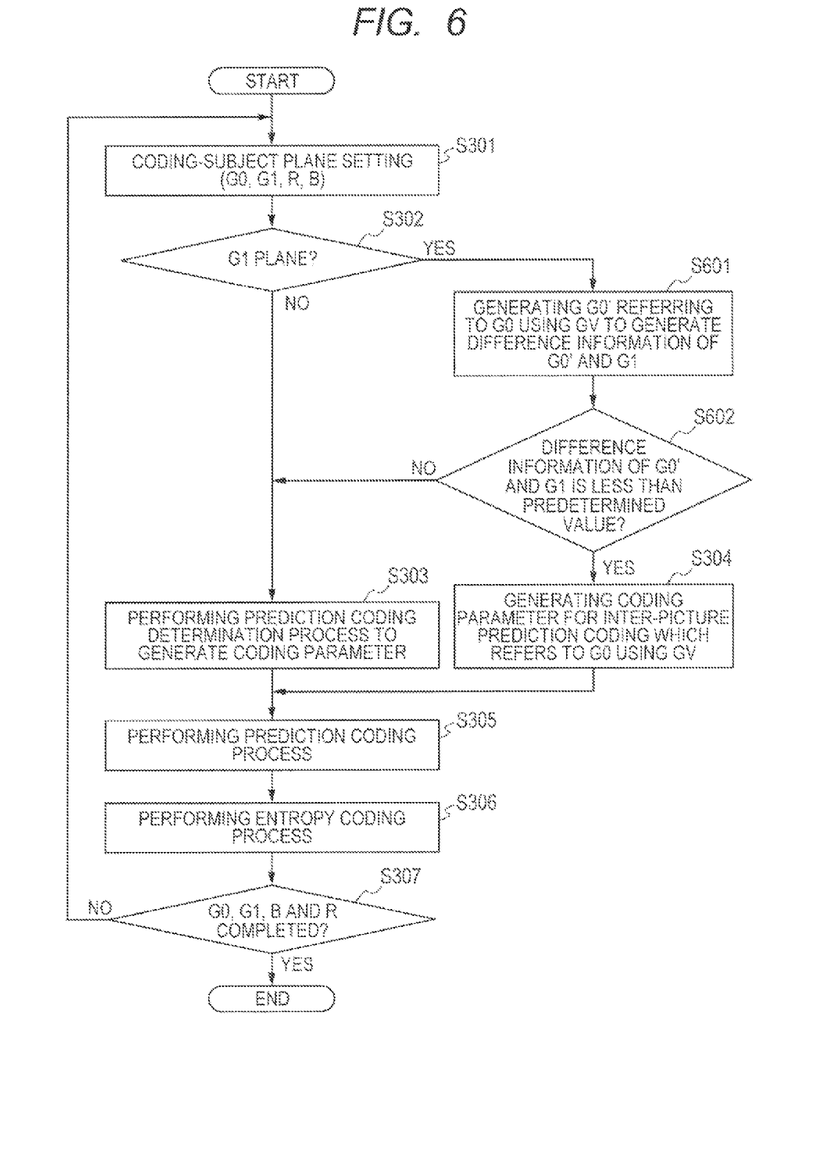
FIG. 6 is a diagram illustrating a flowchart for the coding operation according to a modification of the first embodiment of the invention.

First, in a manner similar to the first embodiment, whether or not the G1 plane is set as a coding-target picture to the separated G0, G1, B, and R planes is discriminated (S301-S302). If the set plane is other than G1, the coding parameter by the execution of the prediction coding method determination process is generated in a manner similar to the first embodiment (S303). The prediction coding based on the generated coding parameter is executed (S305). The entropy coding of the generated quantization data (S306) is executed.

If the coding-target picture is G1, a prediction image (G0') which refers to G0 is generated with the vector value (GV) based on the relationship of the pixel positions of the G1 plane in the Bayer array illustrated in FIG. 4 to the G0 plane by the prediction coding method determining unit 105. Subsequently, a sum of absolute difference (hereinbelow, called SAD) of the generated prediction image and the coding-target image (G1) is calculated (S601).

Subsequently, whether or not the calculated SAD value is less than a predetermined value is discriminated (S602). If it is less than the predetermined value, the coding parameter for the inter-picture prediction using the foregoing vector value is generated without executing the prediction coding method determination process (S304). If the SAD value is equal to or larger than the predetermined value, the foregoing prediction coding method determination process by the prediction coding method determining unit 105 is executed and the coding parameter is generated (S303). Subsequently, the prediction coding (S305) based on the generated coding parameter and the entropy coding of the generated quantization data (S306) are executed. When the coding is executed to all of the G0, G1, B, and R planes, the coding process of one frame is completed (S307). Although the process on a frame unit basis is shown here, the similar processing may be executed on a unit basis of a macro block constructed by a unit of 16×16 pixels.

In a manner similar to the first embodiment, with respect to the G0 and G1 planes, as illustrated in FIG. 5A, they may be coded as an image of a double frame rate in which the G0 and G1 planes are time-sequentially arranged. As illustrated in FIG. 5B, the G0 and G1 planes can be also coded as a stereoscopic image in which they are set to different parallax image data.

As mentioned above, the coding parameter determination process to the green component of the RAW data of the Bayer array can be also reduced by the present modification. The high-speed and efficient coding process of the RAW data using the correlation between G0 and G1 can be realized.

Second Embodiment

Subsequently, the second embodiment of the invention will be described with reference to the drawings. Also in this embodiment, since a construction of an image coding apparatus is similar to that of the first embodiment, its description is omitted here. In the second embodiment, in a manner similar to the first embodiment, the reduction of the coding process is further realized in consideration of the correlation between the G0 and G1 planes. Specifically speaking, for example, in the case where the G0 plane is coded earlier than the G1 plane, the coding parameter of the G1 plane is generated by using a result (coding parameter used for the coding) of the coding of the G0 plane which has already been coded. Thus, also in the present embodiment, to the G1 plane to be coded later than the G0 plane, the coding parameter is generated without executing the coding method determination process.

Figure 8:
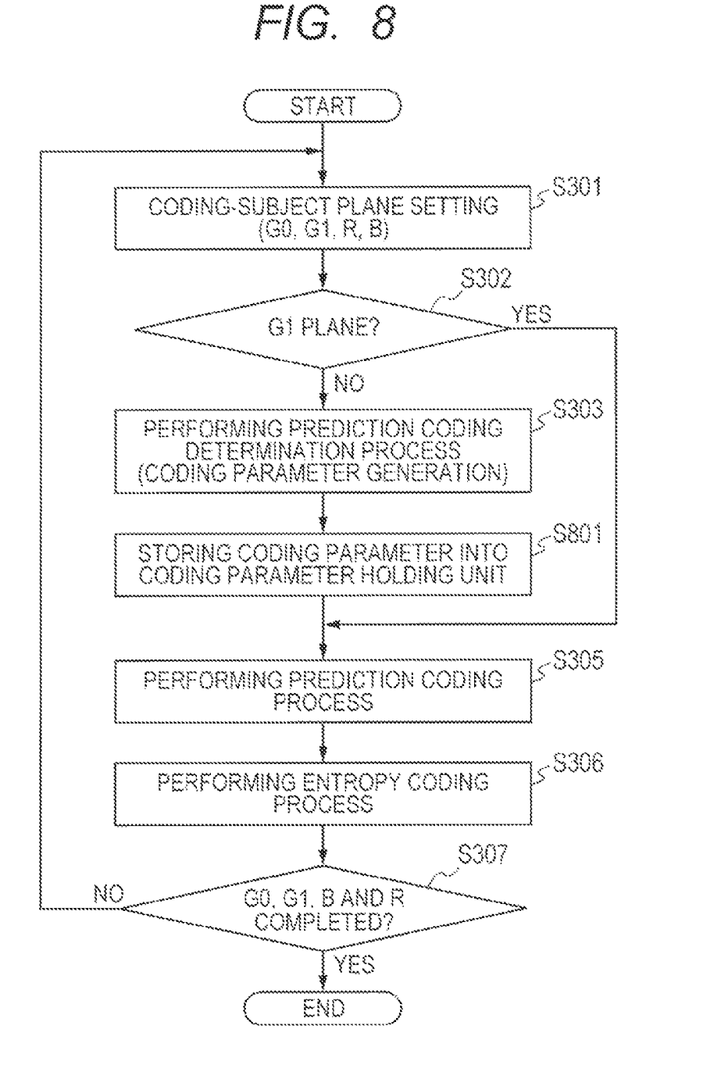
FIG. 8 is a diagram illustrating a flowchart for the coding operation of an image coding apparatus according to the second embodiment of the invention.

The coding operation of the embodiment will be described hereinbelow with reference to the flowchart of FIG. 8. Substantially the same processing steps as those in the first embodiment are designated by the same reference numerals and their description will be simply made.

First, in a manner similar to the first embodiment, whether or not the G1 plane is set as a coding-target picture to the separated G0, G1, B, and R planes is discriminated (S301-S302). If the set plane is other than G1, the coding parameter is determined by executing the prediction coding method determination process by the prediction coding method determining unit 105 (S303). Subsequently, the determined coding parameter is stored into the coding parameter holding unit 106 (S304). After that, in a manner similar to the first embodiment, the prediction coding based on the generated coding parameter is executed (S305). The entropy coding of the generated quantization data (S306) is executed.

If the coding-target picture is G1, since the coding parameter of G0 is applied, the process routine advances to the execution of the prediction coding process (S305) without executing the prediction coding method determination process (S303) by the prediction coding method determining unit 105. In S305, by the prediction coding processing unit 107, the coding parameter of the G0 plane held in the coding parameter holding unit 106 is applied, the coding is executed by the same prediction coding method as that of the G0 plane, and the entropy coding is executed to the generated quantization data (S306). When the coding is executed to all of the G0, G1, B, and R planes, the coding process of one frame is completed (S307). Although the example of the process on a frame unit basis is shown here, the similar processing may be executed on a unit basis of a macro block constructed by a unit of 16×16 pixels.

Figure 9A:
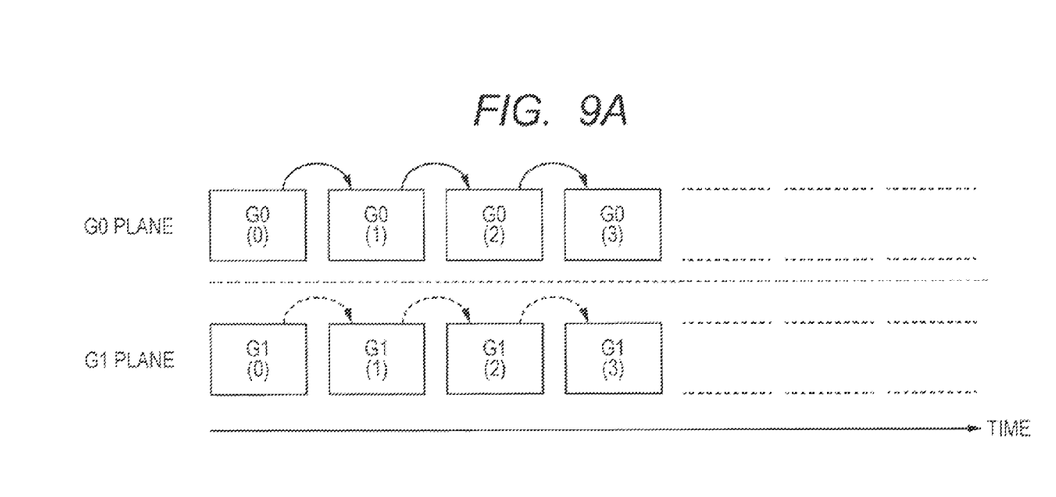
FIGS. 9A and 9B are diagrams illustrating a coding scheme of G0 and G1 planes according to the second embodiment of the invention.
Figure 9B:
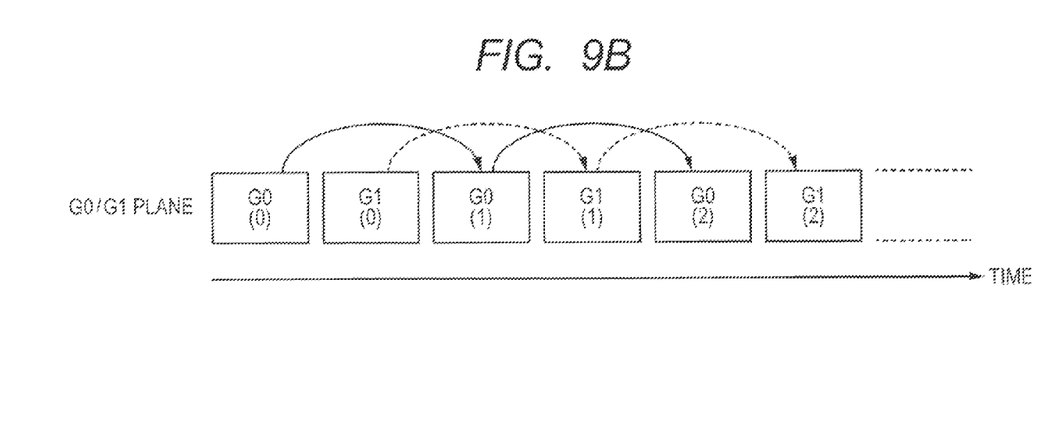

With respect to the G0 and G1 planes, as illustrated in FIG. 9A, they may be coded as coded data in which G0 and G1 are independent or, as illustrated in FIG. 9B, they can be also coded as coded data of a double frame rate in which the G0 and G1 planes are time-sequentially arranged. In any of those cases, a reference relationship between the G1 planes is substantially the same as the reference relationship between the G0 planes using the coding parameter in common.

As mentioned above, also in the present embodiment, in the case where the planes of each color component of the Bayer array are handled like independent planes and are sequentially coded in order of G0, G1, B, and R, the coding parameter generation process can be reduced. The high-speed and efficient coding process of the RAW data can be executed.

Modification of the Second Embodiment

In the second embodiment, the correlation between the G1 plane and the G0 plane is used as a prerequisite and the coding parameter of the G0 plane is used in common for the coding parameter of the G1 plane. A modification of the second embodiment has such a construction that a degree of similarity between the G0 and G1 planes is discriminated and when the similarity is high, the coding parameter is used in common.

Figure 10:
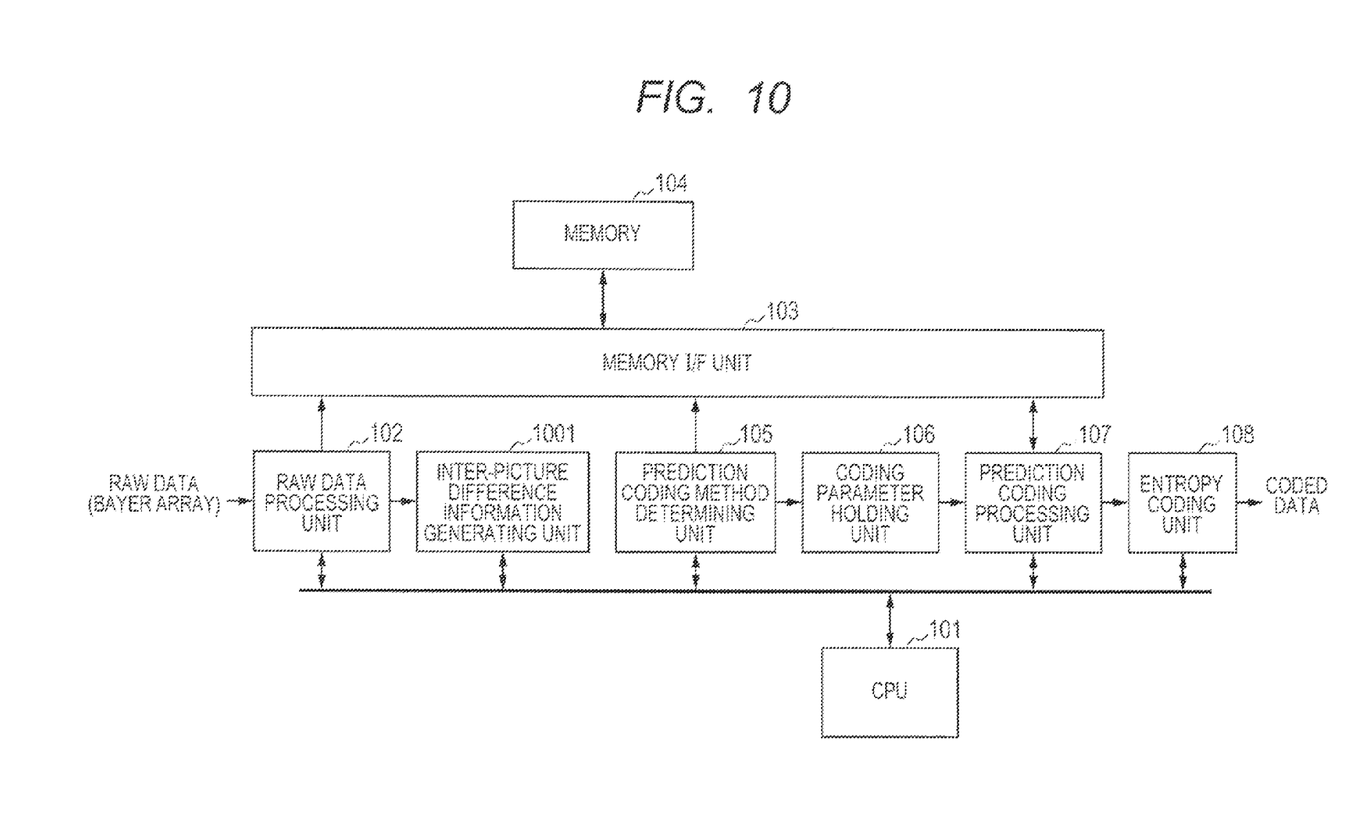
FIG. 10 is a block diagram illustrating a construction of the image coding apparatus according to a modification of the second embodiment of the invention.

A construction of the image coding apparatus in the present modification is illustrated in FIG. 10. In the diagram, the present modification differs from the second embodiment with respect to a point that the RAW data processing unit 102 has an inter-picture difference information generating unit 1001 for outputting pixel values of the G0 and G1 planes. Substantially the same component elements as those in the first embodiment are designated by the same reference numerals and their description is omitted here.

In a manner similar to the first embodiment, the RAW data processing unit 102 writes the RAW data separated into the G0, B, R, and G1 planes into the memory 104 and outputs the pixel values of the G0 and G1 planes to the inter-picture difference information generating unit 1001.

To the pixel values of the G0 and G1 planes which are input from the RAW data processing unit 102, the inter-picture difference information generating unit 1001 calculates a difference on a predetermined pixel block basis (for example, a block of 16×16 pixels) and calculates its SAD value. The calculated SAD value is notified to the CPU 101 as inter-picture difference information by the inter-picture difference information generating unit 1001. A construction of other portions is similar to that of the first embodiment.

Figure 11:
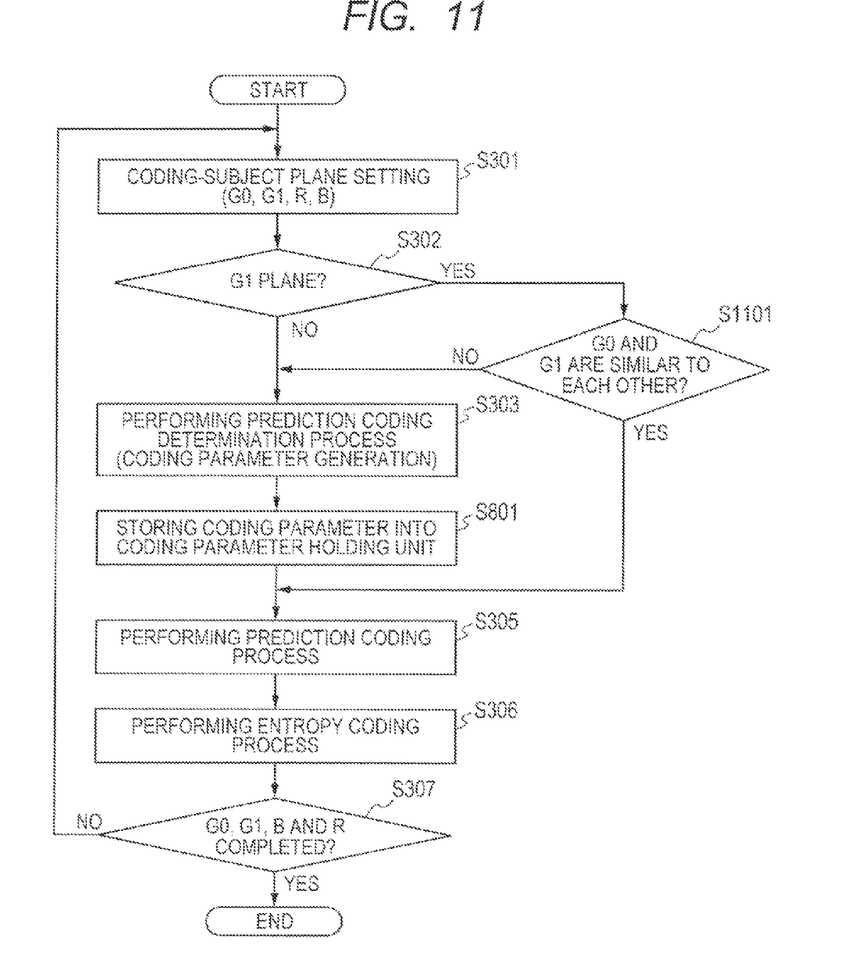
FIG. 11 is a diagram illustrating a flowchart for the coding operation of the image coding apparatus according to the modification of the second embodiment of the invention.

Subsequently, the coding operation to one frame of the RAW data according to the present modification will be described with reference to a flowchart illustrated in FIG. 11. Substantially the same processing steps as those in the second embodiment are denoted with the same reference numerals and their description will be simply made.

First, in a manner similar to the second embodiment, whether or not the G1 plane is set as a coding-target picture to the separated G0, G1, B, and R planes is discriminated (S301-S302). If the set plane is other than G1, the coding parameter is determined by the prediction coding method determining unit 105 (S303). The determined coding parameter is stored into the coding parameter holding unit 106 (S801). Subsequent process are similar to those in the second embodiment.

If the coding-target picture is G1, a degree of similarity of the G0 and G1 planes is further discriminated on the basis of the inter-picture difference information notified by the inter-picture difference information generating unit 1001. If the SAD value serving as inter-picture difference information is equal to or larger than a predetermined value, since the correlation between the G0 and G1 planes is low, it is determined that they are not similar (S1101). The prediction coding method determination process by the prediction coding method determining unit 105 is executed. When the SAD value is less than the predetermined value, since the correlation is high, it is determined that they are similar (S1101), and the coding parameter of G0 is applied. Therefore, the prediction coding method determination process (S303) by the prediction coding method determining unit 105 is not executed. Subsequently, by the prediction coding processing unit 107, the coding parameter of the G0 plane held in the coding parameter holding unit 106 is applied, the prediction coding is executed (S305), and the entropy coding is executed to the quantization data which is output (S306). When the coding is executed to all of the G0, G1, B, and R planes, the coding process of one frame is completed (S608). Although the process on a frame unit basis is shown here, the similar process may be executed on a unit basis of a macro block constructed by a unit of 16×16 pixels.

Although the inter-picture difference information generating unit 1001 is provided to calculate the SAD value, such a function may be provided for the prediction coding method determining unit 105 in a manner similar to the modification of the first embodiment.

Also in the present modification, in a manner similar to the second embodiment, with respect to the G0 and G1 planes, as illustrated in FIG. 9A, the G0 and G1 planes may be coded as independent coded data. As illustrated in FIG. 9B, the G0 and G1 planes can be also coded as coded data of a double frame rate in which they are time-sequentially arranged.

As mentioned above, in the present modification, the coding parameter of the G0 plane which is executed before is held and, when the G0 and G1 planes are similar, the coding parameter of the G0 plane is applied to the coding of the G1 plane. Also by this method, since the prediction coding method determination process and the coding parameter generation process can be reduced, the RAW data can be coded at a high speed.

Each unit constructing the image coding apparatus in the embodiments of the invention mentioned above and each processing step of the image coding method can be realized by a method whereby the program stored in the RAM, ROM, or the like of the CPU operates. The program and a computer-readable storage medium in which the program is stored are incorporated in the invention.

The invention can be also embodied as, for example, a system, an apparatus, a method, a program, a storage medium, or the like. Specifically speaking, the invention can be also applied to a system constructed by a plurality of apparatuses or to an apparatus constructed by one equipment.

The invention incorporates a case where a program of software for realizing the functions of the embodiments as mentioned above (program corresponding to the flowchart of FIG. 3, 6, 8, or 11 in the embodiments) is directly supplied to a system or apparatus or is supplied from a remote place. The invention also incorporates a case where the functions of the embodiments are accomplished by a method whereby a computer of the system or apparatus reads out and executes a program code of the supplied program.

Therefore, the program code itself which is installed into a computer in order to realize the functions and processings of the invention by the computer also realizes the invention. That is, a computer program itself for realizing the functions and process of the invention is also incorporated in the invention. In this case, any form such as object code, program which is executed by an interpreter, script data which is supplied to the OS, or the like may be used so long as it has the functions of the program.

As a storage medium for supplying the program, for example, there is a flexible disk, a hard disk, an optical disk, a magnetooptic disk, or the like. Further, there is an MO, a CD-ROM, a CD-R, a CD-RW, a magnetic tape, a nonvolatile memory card, a ROM, a DVD (DVD-ROM, DVD-R), or the like.

As another program supplying method, there is a method whereby a computer is connected to Homepage of the Internet by using a browser of a client computer. The program can be also supplied by supplying the computer program itself of the invention from Homepage or by downloading a compressed file including an automatic installing function into a storage medium such as a hard disk or the like.

The program supplying method can be also realized by a method whereby the program code constructing the program of the invention is divided into a plurality of files and each file is downloaded from different Homepage. That is, a WWW server for allowing a plurality of users to download a program file for realizing the functions and process of the invention by the computer is also incorporated in the invention.

As another method, the program supplying method can be also realized by a method whereby the program of the invention is encrypted, stored into the storage medium such as a CD-ROM or the like, and distributed to the users, the users who can clear predetermined conditions are allowed to download key information for decrypting the encryption from Homepage through the Internet, and by using the key information, the encrypted program is executed and installed into the computer.

The functions of the embodiments mentioned above are realized by a method whereby the computer executes the read-out program. Further, the functions of the embodiments mentioned above are also realized by a method whereby the OS or the like which operates on the computer executes a part or all of actual processings on the basis of instructions of the program, and those functions are realized by those processings.

Further, as another method, the functions of the embodiments mentioned above are also realized by a method whereby the program which is read out of the storage medium is written into a memory provided for a function expanding board inserted in a computer or a function expanding unit connected to the computer, a CPU or the like provided for the function expanding board or function expanding unit executes a part or all of actual processings on the basis of instructions of the program, and those functions are realized by those processings.

While the present invention is described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-222170 filed on Oct. 4, 2012, which is hereby incorporated by reference herein in its entirety.

What is claimed is:

1. An image coding apparatus for coding RAW data of an image of a Bayer array, comprising:
 a separating unit configured to separate the RAW data respectively into separate planes of data of a plurality of color components constituting the Bayer array;
 a coding parameter generating unit configured to determine a coding method for coding each plane separated by the separating unit from a plurality of coding methods and generate a coding parameter on the basis of the determined coding method; and
 a coding unit configured to code each of the planes on the basis of the generated coding parameter,
 wherein in a case where a coding-target plane is a plane to be coded later among a plurality of planes of a same color, the coding parameter generating unit determines the coding method including an inter-plane prediction from among the plurality of coding methods, and generates the coding parameter for coding the plane to be coded later on the basis of a result of the coding of a plane to be coded earlier among the plurality of planes of the same color.

2. An apparatus according to claim 1, wherein in a case where the coding-target plane is the plane to be coded later among the plurality of planes of the same color, the coding parameter generating unit generates the coding parameter for inter-plane prediction coding based on a common vector value of a case where a coded plane of the plane to be coded earlier is a plane to be referred to and the plane to be coded later is a plane referring to the plane to be referred to.

3. An apparatus according to claim 2, wherein the common vector value is a value based on a relationship between distances of pixel positions in the Bayer array in the plane to be referred to and the plane referring to the plane to be referred to and a pixel position after the plane separation by the separating unit.

4. An apparatus according to claim 2, wherein the coding parameter generating unit generates difference information between a prediction image generated from the plane to be referred to based on the coding parameter of the plane referring to the plane to be referred to and the plane to be coded later among the plurality of planes of the same color which is the coding-target planes, and in a case where the difference information is less than a predetermined value, the coding parameter generating unit generates the coding parameter for the plane to be coded later among the plurality of planes of the same color which are the coding-target plane by using the plane coded earlier among the plurality of planes of the same color.

5. An apparatus according to claim 1, wherein for the plurality of planes of the same color, the coding parameter generating unit executes a predetermined coding method determination process to the plane to be coded earlier among the plurality of planes of the same color and generates the coding parameter, and the coding parameter generating unit does not execute the predetermined coding method determination process to the plane to be coded later among the plurality of planes of the same color and applies the coding parameter used in the coding of the plane coded earlier.

6. An apparatus according to claim 5, wherein the coding parameter generating unit generates information indicating a degree of similarity among the plurality of planes of the same color and, when the degree of similarity is less than a predetermined value, applies the coding parameter generated for the plane to be coded earlier to the plane to be coded later.

7. An apparatus according to claim 1, wherein the coding unit performs the coding to the plurality of planes of the same color in a manner of coding of a series of image data in which the planes are time-sequentially arranged.

8. An apparatus according to claim 1, wherein the coding unit performs the coding to the plurality of planes of the same color in a manner of coding of a stereoscopic image in which each plane is set to different parallax image data.

9. An apparatus according to claim 1, wherein for each plane, the coding parameter generating unit determines the coding method of a high coding efficiency as the coding method between an intra-plane prediction coding method and an inter-plane prediction coding method.

10. An apparatus according to claim 1, wherein the RAW data of the Bayer array includes a first green component, a second green component, a blue component, and a red component, and the plurality of planes of the same color are planes separated by the separating unit with respect to the first green component and the second green component.

11. An apparatus according to claim 1, wherein the coding parameter is one of prediction mode information for an intra-plane prediction coding, motion vector information for an inter-plane prediction coding, and a quantization parameter or a combination thereof.

12. An image coding method of coding RAW data of an image of a Bayer array, comprising:
   separating the RAW data respectively into separate planes of data of a plurality of color components constituting the Bayer array;
   determining a coding method for coding each separate plane from a plurality of coding methods; generating a coding parameter on the basis of the determined coding method; storing the coding parameter in a memory; and
   coding each of the planes on the basis of the coding parameter stored in the memory,
   wherein in a case where a coding-target plane is a plane to be coded later among a plurality of planes of a same color, the determining step determines the coding method including an inter-plane prediction from among the plurality of coding methods, and the generating step generates the coding parameter for coding the plane to be coded later on the basis of a result of the coding of a plane to be coded earlier among the plurality of planes of the same color.

13. A non-transitory computer-readable storage medium which stores a program for allowing a computer to execute the image coding method according to claim 12.

14. An image coding apparatus for coding RAW data of an image of a Bayer array, comprising:
   a separating unit configured to separate the RAW data respectively into separate planes of data of a plurality of color components constituting the Bayer array;
   a coding parameter generating unit configured to determine a coding method for coding each plane separated by the separating unit from a plurality of coding methods and generate a coding parameter on the basis of the determined coding method; and
   a coding unit configured to code each of the planes on the basis of the generated coding parameter,
   wherein in a case where a coding-target plane is a plane to be coded later among a plurality of planes of a same color, the coding parameter generating unit generates a coding parameter for prediction-coding the plane to be coded later by using the plane to be coded earlier among the plurality of planes of the same color as a plane to be referred to, and
   wherein the coding unit prediction-codes the plane to be coded later on the basis of the generated coding parameter.

15. An image coding apparatus for coding RAW data of an image of a Bayer array, comprising:
   a separating unit configured to separate the RAW data respectively into separate planes of data of a plurality of color components constituting the Bayer array;
   a coding parameter generating unit configured to determine a coding method for coding each plane separated by the separating unit from a plurality of coding methods and generate a coding parameter on the basis of the determined coding method; and
   a coding unit configured to code each of the planes on the basis of the generated coding parameter,
   wherein in a case where a coding-target plane is a plane to be coded later among a plurality of planes of a same color, the coding parameter generating unit generates a coding parameter for coding the plane to be coded later from a coding parameter of the plane to be coded earlier among the plurality of planes of the same color, and
   wherein the coding unit codes the plane to be coded later on the basis of the generated coding parameter.

* * * * *